United States Patent Office 3,337,402
Patented Aug. 22, 1967

3,337,402
STABLE AND PALATABLE PHARMACEUTICAL COMPOSITION
Margaret Rose Zentner, West Orange, N.J., assignor to Hoffmann-La Roche Inc., Nutley, N.J., a corporation of New Jersey
No Drawing. Filed Sept. 3, 1963, Ser. No. 306,298
6 Claims. (Cl. 167—55)

This application is a continuation-in-part of application Ser. No. 149,539, filed Nov. 2, 1961, now U.S. Patent No. 3,140,978.

This invention relates, in general, to novel pharmaceutical compositions and to a process for making same. More particularly, the invention relates to improved oral pharmaceutically acceptable dosage forms of 7-chloro-1-methyl-5-phenyl-3H-1,4-benzodiazepin-2(1H)-one.

7 - chloro - 1 - methyl-5-phenyl-3H-1,4-benzodiazepin-2 (1H)-one is a known compound having pronounced sedative activity. This compound is water-insoluble and, hence, where a liquid dosage form thereof is required, the compound is provided in the form of an aqueous suspension. Such suspensions, however, have proven to be far from satisfactory. In the first place, suspensions of 7-chloro-1-methyl-5-phenyl-3H-1,4-benzodiazepin-2(1H)-one have a distinctive bitter taste. Moreover, these suspensions have a slight, but yet readily recognizable anesthetizing effect on the tongue. Obviously, such properties greatly diminish patient acceptance of the drug. Furthermore, suspensions of this drug, particularly the more highly concentrated suspensions, are relatively unstable. Sedimentation of the drug occurs rapidly when the suspension is allowed to stand at ordinary room temperatures. Rapid settling or sedimentation of the active drug ingredient from suspensions makes it extremely difficult to accurately administer the drug at recommended dosage levels.

In its most comprehensive embodiment, the present invention is concerned with a product which provides all of the therapeutic values of 7-chloro-1-methyl-5-phenyl-3H-1,4-benzodiazepin-2(1H)-one and which, at the same time, is capable of being embodied into a satisfactory liquid dosage form.

In a more restricted embodiment, the invention is concerned with a 7-chloro-1-methyl-5-phenyl-3H-1,4-benzodiazepin-2(1H)-one reaction product capable of forming suspensions in aqueous vehicles which, even at high concentrations, are devoid of the characteristic bitter taste of the drug and which manifest little or no tendency toward sedimentation.

In another limited embodiment, the invention is concerned with stable and non-bitter tasting suspensions having 7 - chloro - 1-methyl-5-phenyl-3H-1,4-benzodiazepin-2 (1H)-one as the active ingredient thereof.

It has now been found that products which are prepared by reacting 7 - chloro - 1-methyl-5-phenyl-3H-1,4-benzodiazepin-2(1H)-one with a complex magnesium aluminum silicate, the nature of which will be described more fully hereinafter, form stable, non-bitter tasting suspensions in pharmaceutically acceptable liquid vehicles which, in therapeutic value, are entirely comparable to suspensions containing the drug alone.

In carrying out this invention, 7-chloro-1-methyl-5-phenyl-3H-1,4-benzodiazepin-2(1H)-one is reacted with a magnesium aluminum silicate, such as the product known as "Veegum." Veegum is a standard item of commerce and it is sold under that trade name by the R. T. Vanderbilt Company, Inc., New York, N.Y. The chemical analysis of Veegum, expressed as oxides, is as follows:

| | Percent |
|---|---|
| Silicon dioxide | 61.1 |
| Magnesium oxide | 13.7 |
| Aluminum oxide | 9.3 |
| Titanium dioxide | 0.1 |
| Ferric oxide | 0.9 |
| Calcium oxide | 2.7 |
| Sodium oxide | 2.9 |
| Potassium oxide | 0.3 |
| Carbon dioxide | 1.8 |
| Water of combination | 7.2 |

In a more preferred embodiment of the invention, a complex magnesium aluminum silicate sold as neutral "Veegum" is employed. Neutral Veegum, like the regular grade of Veegum, is a standard item of commerce marketed by R. T. Vanderbilt Company, Inc. Neutral Veegum differs from the regular grade of Veegum in that its sodium content, expressed as sodium oxide, is about 1.0%. The regular grade of Veegum has a sodium content, expressed as sodium oxide, of about 2.9%. Moreover, in the form of a 5% by weight aqueous dispersion, neutral Veegum has a viscosity of about 100 centipoises ($\pm 50\%$) and a pH of about 7.5. A 5% by weight aqueous dispersion of the regular grade of Veegum has a viscosity of about 250 centipoises ($\pm 25\%$) and a pH of about 9.0. Finally, neutral Veegum has an acid demand of less than 1 cc. of N/10 hydrochloric acid per gram, whereas the acid demand of the regular grade of Veegum is about 6 to 8 cc. of N/10 hydrochloric acid per gram.

The regular grade of Veegum is marketed in the form of a powder. Neutral Veegum is marketed in the form of small white flakes. While particle size is not particularly critical to the operability of this invention, a complex magnesium aluminum silicate which has been reduced to a finely divided powder form is preferably used. Such a product can be obtained, for example, by passing neutral Veegum flakes through a microatomizer or through some similar device.

It should be fully understood that, while the present invention will be described with particular reference to the use of Veegum type products as the complex magnesium aluminum silicate reactant, the underlying principle of the invention is applicable equally to the use of other complex magnesium aluminum silicate compounds which are similar in nature and composition to Veegum type products.

The reaction products of 7-chloro-1-methyl-5-phenyl-3H-1,4-benzodiazepin-2(1H)-one and the magnesium aluminum silicate compound are readily prepared. The drug is, as indicated heretofore, water-insoluble but it is soluble in lower molecular weight monohydroxy aliphatic alcohols, such as ethanol, isopropanol, etc. Moreover, the drug is soluble in aqueous alcohol mixtures. In carrying out this invention, 7-chloro-1-methyl-5-phenyl-3H-1,4-benzodiazepin-2(1H)-one is first dissolved either in a lower molecular weight aliphatic monohydroxy alcohol or in an aqueous alcohol mixture. Dissolution of the compound in the solvent can be effected at room temperature or at a temperature above room temperature. Generally, however, the drug will be dissolved in the solvent at a temperature not above about 75° C. After the solution has been obtained, the complex aluminum magnesium silicate compound is mixed therewith. In this step of the process, the drug solution can be added to, and mixed with, the complex silicate compound or the latter can be added to, and mixed with, the drug solution. In the preferred embodiment of the invention, the solution of 7-chloro - 1 - methyl - 5 - phenyl - 3H - 1,4 - benzodiazepin-2(1H)-one is added to the complex magnesium aluminum silicate compound. The desired reaction between 7-chloro - 1 - methyl - 5 - phenyl - 3H - 1,4 - benzodiazepin-2(1H)- one and the complex magnesium aluminum silicate compound will occur simply by mixing the reactants at room temperature. If desired, however, the reaction can be carried out by mixing the reactants at a temperature above room temperature. In such instances, one can employ any temperature up to the boiling point of the solvent present. When proceeding in the preferred manner, however, the solution of 7-chloro-1-methyl - 5-phenyl-3H-1,4-benzodiazepin-2(1H)-one, while warm, is added to the complex magnesium aluminum silicate compound and mixed therewith until a homogeneous, completely wetted mass is obtained. To accomplish this, additional quantities of solvent can be added if necessary. The reaction mixture is mixed until the reaction is completed. It has been found that, under ordinary circumstances, the reaction is substantially complete after mixing for about thirty minutes. When the reaction is complete, the product is dried, generally in an oven at an elevated temperature, to constant weight.

The ratio of complex magnesium aluminum silicate to 7 - chloro - 1 - methyl - 5 - phenyl - 3H - 1,4 - benzodiazepin-2(1H)-one which is employed in producing the products of this invention is variable within rather wide limits. In general, there will be provided at least about 40.0 parts by weight of the complex magnesium aluminum silicate for each part by weight of 7-chloro-1-methyl-5-phenyl-3H-1,4-benzodiazepin-2(1H)-one. While greater quantities of the complex silicate compound can be used, if desired, no particular advantage is seen in the use of more than about 80.0 parts by weight of that compound for each part by weight of the 1,4-benzodiazepin-2(1H)-one compound. In the preferred embodiment of the invention, there is used from about 50.0 to about 80.0 parts by weight of the complex magnesium aluminum silicate for each part by weight of 7-chloro-1-methyl-5-phenyl-3H-1,4-benzodiazepin-2(1H)-one.

Similarly, the quantity of alcohol, or aqueous alcohol, which is used in carrying out this invention can be varied within rather wide limits. In preparing the solution of 7-chloro - 1 - methyl - 5 - phenyl - 3H - 1,4 - benzodiazepin-2(1H)-one, a sufficient quantity of alcohol, or alcohol-water mixture, should be used to completely dissolve the drug. Generally, however, there is used from about 30 to about 70 parts by weight of solvent for each part by weight of the drug. Furthermore, where a mixed alcohol-water system is used as the solvent for 7-chloro-1-methyl-5-phenyl-3H-1,4-benzodiazepin-2(1H)-one, the quantity of water present in the mixed solvent should be less than that quantity which will cause the drug to precipitate out of solution. Generally, where a mixed solvent system is used, water will comprise not more than about 40% of the volume of the mixture.

The precise nature of the products which are obtained by the reaction described in the preceding paragraphs has not as yet been established. It has been found, however, that the products are not merely physical mixtures of 7 - chloro - 1 - methyl - 5 - phenyl - 3H - 1,4 - benzodiazepin-2(1H)-one and the complex magnesium aluminum silicate compound. This conclusion is based on the fact that considerable difficulty has been encountered in the laboratory in separating the active drug ingredient from the reaction product. As a result of this, those analytical methods which are normally used in assaying the drug cannot be used in assaying the products of this invention. Due to the nature of the product which is produced, it has been necessary to devise special procedures involving, for example, alkaline extraction techniques, to liberate the drug for assay. The foregoing notwithstanding however, pharmacological tests have demonstrated that 7 - chloro - 1 - methyl - 5 - phenyl - 3H - 1,4 - benzodiazepin-2(1H)-one is released from the reaction product under physiological conditions and that, when so liberated, it manifests full activity.

The manner in which the products described herein are used in the formulation of suspensions suitable for pharmaceutical use will be readily apparent to persons skilled in the art. Where the alcohol, which is used as the solvent media for the reaction, is one which is suitable for pharmaceutical use, the reaction product can be suspended directly in a suitable syrup without first separating it from the alcohol. In the alternative, the reaction product may be separated from the solvent by appropriate means, for example, by drying or filtration, following which it can be pulverized into a fine powder. The powder can, thereafter, be suspended in a suitable syrup vehicle.

In general, the reaction products, which are produced as described in the preceding paragraphs, can be formulated into desired suspensions by conventional methods. Moreover, there can be incorporated into those suspensions any of the adjuvant materials customarily employed in the formulation of the suspensions of the prior art. For example, the suspension of this invention can contain, as adjuvants, suitable suspending agents, such as polyoxyethylene sorbitan fatty esters, polyoxyethylene esters of fatty acids, etc.; preservatives, such as benzoic acid, methyl - p - hydroxybenzoate, propyl - p - hydroxybenzoate, sorbic acid, etc.; buffers, such as lactic acid, citric acid, etc.; sweetening agents, such as sugar or artificial sweetening agents; antifoaming agents; coloring agents; flavoring agents, etc.

The suspensions of this invention are outstanding oral dosage forms of the therapeutically valuable drug, 7-chloro - 1 - methyl - 5 - phenyl - 3H - 1,4 - benzodiazepin-2(1H)-one. The present suspensions, unlike those containing 7 - chloro - 1 - methyl - 5 - phenyl - 3H - 1,4 - benzodiazepin-2(1H)-one which is unreacted with a complex magnesium aluminum silicate compound, are not bitter. This is exceedingly important since it enhances greatly patient acceptance of the medicament. Moreover, the problem of the sedimentation of the active drug ingredient, which is ever present in the case of suspensions of 7-chloro - 1 - methyl - 5 - phenyl - 3H - 1,4 - benzodiazepin-2(1H)-one, is obviated by the practice of this invention. Little, if any, sedimentation occurs when the reaction products disclosed herein are present as the active drug ingredient of suspensions produced by conventional methods. This feature is significant since it facilitates the administration of the drug in proper safe and effective doses. The unusual and unexpected properties of the present products have proven to be of particular interest in the formulation of suspensions containing high concentrations of the drug. Obviously, however, such properties are equally as important in the case of suspensions containing relatively low concentrations of the drug.

While, as indicated heretofore, this invention is designed primarily to provide 7-chloro-1-methyl-5-phenyl-3H-1,4-benzodiazepin-2(1H)-one in a form suitable for producing stable, non-bitter tasting suspensions, it will be appreciated that the products can be formulated also into other oral dosage forms. In general, the reaction products, in dry, powdery form, are tasteless, stable and therapeutically active and they can be formulated, using conventional adjuvants, into lozenges, tablets, candies, etc. In the alternative, the dry products can be filled into suitable hard or soft shell capsules. Such other oral dosage forms can be produced by conventional methods using the adjuvants and excipients customarily found in comparable prior art products.

For a fuller understanding of the nature and objects of this invention, reference may be had to the following examples which are given merely as further illustrations of the invention and are not to be construed in a limiting sense.

Example 1

In this example, 1.02 grams of 7-chloro-1-methyl-5-phenyl-3H-1,4-benzodiazepin-2(1H)-one, a bitter tasting drug, was dissolved at about 50° C. in a mixture comprising 30 cc. of isopropanol and 20 cc. of water. This solution was added to 60.0 grams of neutral Veegum and, upon intimately mixing same, a paste-like product was obtained. The paste was dried to constant weight and the dry product was thereafter pulverized. The dry product produced by this method was tasteless. It was stable and physiologically active.

Example 2

In this example, 1.05 grams of 7-chloro-1-methyl-5-phenyl-3H-1,4-benzodiazepin-2(1H)-one was added to, and dissolved in, a mitxure of 30 cc. of ethyl alcohol and 20 cc. of distilled water at a temperature of about 50° C. The solution, while still warm, was added to, and mixed with, 60.0 grams of neutral Veegum. A small additional quantity of ethyl alcohol-water (30:20) mixture was added subsequently to insure complete and thorough wetting of the mixture. The mixture was then stirred for a period of 30 minutes. Thereafter, the product was dried to constant weight at a temperature of 40° C., following which the dry, powdery product was pulverized.

The product, produced as described in the preceding paragraph, was formulated into an aqueous suspension in the following manner: 350 cc. of distilled water were heated to a temperature of about 90° C. There was added thereto, 61.05 grams of the dry reaction product produced as described in the preceding paragraph. This mixture was stirred for a period of about two hours at a temperature within the range of from about 80° C. to 85° C., following which 7.5 grams of Myrj 45 (a polyoxyethylene (8) stearate dispersing agent sold by Atlas Powder Company, Wilmington, Delaware) and 550.0 grams of sucrose were added thereto and dissolved therein. Thereafter, the solution was cooled to a temperature within the range of from about 45° C. to 50° C. and a solution containing 125.0 grams of glycerin, 0.9 gram of methyl-p-hydroxybenzoate and 0.2 gram of propyl-p-hydroxybenzoate was added thereto and mixed therewith. Subsequently, a solution containing 25.0 cc. of distilled water, 1.8 grams of sodium hydroxide, 2.5 grams of benzoic acid, 2.0 grams of sodium sucaryl, 0.2 gram of sodium saccharin, 0.1 gram of disodium sequestrene and 210.0 grams of sorbitol was added and mixed therewith. Immediately afterward, 11.0 grams of lactic acid (U.S.P.) was added.

A dispersion containing 0.033 gram of Antifoam C, (a silicone type antifoaming agent having a silicone content of 30%, manufactured and sold by Dow Corning Corporation, Midland, Mich.) was prepared and added to the mixture described in the preceding paragraph. To the mixture, thus produced, there was added a mixture of 0.25 gram of FD & C Red No. 4, 0.1 gram of FD & C Red No. 2 and 5.0 cc. of distilled water. Thereafter, flavoring agents were added, as needed, following which the product was adjusted to pH 4.0 with sodium hydroxide. Finally, distilled water was added to make 1000 cc. and the suspension was mixed, homogenized and deaerated.

The suspension which was thus obtained contained 5 mg. of 7-chloro-1-methyl-5-phenyl-3H-1,4-benzodiazepin-2(1H)-one per 5 cc. The suspension was stable, that is, no sedimentation occurred, when allowed to stand at normal atmospheric conditions for long periods of time. Moreover, the suspension was devoid of the bitter taste which ordinarily characterizes suspensions containing 7-chloro-1-methyl-5-phenyl-3H-1,4-benzodiazepin-2(1H)-one.

Example 3

A reaction product of 7-chloro-1-methyl-5-phenyl-3H-1,4-benzodiazepin-2(1H)-one and neutral Veegum was prepared by the same procedure employed in Example 2 using, with one exception, the same ingredients and the same quantities thereof as were used in Example 2. In this example, the reaction was carried out in 50 cc. of ethyl alcohol (U.S.P.), rather than in a mixture of 30 cc. of ethyl alcohol (U.S.P.) and 20 cc. of distilled water.

An aqueous suspension was prepared using the dry, powdery product, produced as described in the preceding paragraph, as the active drug ingredient. The suspension contained, in addition to 12.2 grams of the 7-chloro-1-methyl-5-phenyl - 3H - 1,4 - benzodiazepin-2(1H)-one-Veegum reaction product, the following-named components in the quantities hereinafter indicated:

| | Grams |
|---|---|
| Myrj 45 | 1.0 |
| Sucrose | 550.0 |
| Glycerin | 125.0 |
| Methyl-p-hydroxybenzoate | 0.9 |
| Propyl-p-hydroxybenzoate | 0.2 |
| Sodium hydroxide | 3.0 |
| Benzoic acid | 2.5 |
| Sodium sucaryl | 1.0 |
| Disodium sequestrene | 0.1 |
| Sorbitol | 210.0 |
| Lactic acid (U.S.P.) | 15.0 |
| Antifoam C | 0.033 |
| FD and C Red No. 4 | 0.25 |
| FD and C Red No. 2 | 0.10 |
| FD and C Violet No. 1 | 0.02 |
| Flavoring agents | As needed |
| Distilled water | q.s. to 1000.0 cc. |

Such suspension was prepared in the same manner as the suspension described in Example 2. It was observed that the suspension, thus obtained, which contained 1 mg./5 cc. of 7-chloro-1-methyl-5-phenyl-3H-1,4-benzodiazepin-2(1H)-one, was stable, that is, sedimentation occurred only at a relatively slow rate, when allowed to stand for extended periods of time at normal atmospheric conditions of temperature and humidity. Moreover, the suspension did not have the bitter taste which ordinarily characterizes conventional aqueous suspensions of 7-chloro-1-methyl-5-phenyl-3H-1,4-benzodiazepin - 2(1H)-one.

Example 4

The dry, powdery reaction product of 7-chloro-1-methyl-5-phenyl - 3H-1,4-benzodiazepin-2(1H)-one with Veegum, which was produced as described in Example 1, was formulated into an aqueous suspension by the procedure set forth in Example 2. Such suspension contained, in addition to 24.42 grams of the Veegum reaction product with 7-chloro-1-methyl-5-phenyl-3H-1,4-benzodiazepin-2(1H)-one, the following-named ingredients in the quantities hereinafter indicated:

| | Grams |
|---|---|
| Myrj 45 | 1.0 |
| Sucrose | 550.0 |
| Glycerin | 125.0 |
| Methyl-p-hydroxybenzoate | 0.9 |
| Propyl-p-hydroxybenzoate | 0.2 |
| Sodium hydroxide | 3.5 |
| Benzoic acid | 2.5 |
| Sodium sucaryl | 1.0 |
| Sodium saccharin | 0.1 |
| Disodium sequestrene | 0.1 |
| Sorbitol | 210.0 |
| Lactic acid (U.S.P.) | 20.0 |
| Antifoam C | 0.033 |
| FD & C Red No. 4 | 0.25 |
| FD & C Red No. 2 | 0.10 |
| FD & C Violet No. 1 | 0.02 |
| Flavoring agents | As needed |
| Distilled water | q.s. to 1000.0 cc. |

The suspension which was produced was stable, that is, sedimentation occurred only at a relatively slow rate, when allowed to stand at room temperature and atmospheric pressure for extended periods of time. Moreover, the suspension was devoid of the bitter taste which characterizes conventional aqueous suspensions of 7-chloro-1-methyl-5-phenyl-3H-1,4-benzodiazepin-2(1H)-one.

For the sake of completeness, the preparation of 7-chloro-1-methyl-5-phenyl-3H-1,4-benzodiazepin - 2(1H)-one is described in the paragraphs which follow hereinafter, although it should be understood that neither the compound itself nor the process for its preparation comprises part of the instant invention.

A mixture of 23.15 grams (0.1 mol) of 2-amino-5-chlorobenzophenone, 20.8 grams (0.15 mol) of glycine ethyl ester hydrochloride and 50 ml. of pyridine was heated. The pyridine was slowly distilled off while the temperature of the reaction mixture was maintained at 120° to 125° C. by the addition of fresh pyridine to the mixture at the same rate as it was distilled off. The distillation was continued for 4 hours, a total of 120 ml. of pyridine being collected. The mixture was then concentrated in vacuo to a syrup and partitioned between 200 ml. of benzene and 200 ml. of water. The extraction was repeated with 200 ml. of water. During the second washing, some of the product began to crystallize and was filtered off. The benzene solution was separated, diluted with 100 ml. of petroleum ether and left at 0° for 15 hours. The crystalline product, 7-chloro-5-phenyl-3H-1,4-benzodiazepin-2(1H)-one, was filtered off, washed with some benzene until almost colorless and finally with some petroleum ether. The product was then recrystallized from acetone.

1.08 grams (0.02 mol) of sodium methoxide were added to a solution of 5.4 grams (0.02 mol) of 7-chloro-5-phenyl-3H-1,4-benzodiazepin-2(1H)-one and 300 ml. of benzene. 100 ml. of benzene were distilled off in order to remove the liberated methanol, then 1.9 ml. (0.02 mol) of dimethylsulfate were added. The solution was refluxed for one hour, then washed with water, dried over sodium sulfate, filtered and concentrated in vacuo. The residue, 7-chloro-1-methyl-5-phenyl - 3H - 1,4 - benzodiazepin-2-(1H)-one, was crystallized from a mixture of ether and petroleum ether, M.P. 118–120°.

I claim:

1. A stable and palatable pharmaceutically active product produced by mixing (1) a complex magnesium aluminum silicate with (2) a solution of 7-chloro-1-methyl-5-phenyl-3H-1,4-benzodiazepin-2(1H)-one in a solvent selected from the group consisting of ethanol, isopropanol, ethanol and water, and isopropanol and water.

2. A stable and palatable pharmaceutically active product, in the form of a dry powder, produced by mixing (1) a complex magnesium aluminum silicate with (2) a solution of 7-chloro-1-methyl-5-phenyl-3H-1,4-benzodiazepin-2(1H)-one in a solvent selected from the group consisting of ethanol, isopropanol, ethanol and water, and isopropanol and water and subsequently removing said solvent from the reaction mixture.

3. A pharmaceutical preparation, in the form of a palatable stable suspension, comprising a medicinally acceptable liquid vehicle having suspended therein a product produced by mixing (1) a complex magnesium aluminum silicate with (2) 7-chloro-1-methyl-5-phenyl-3H-1,4-benzodiazepin-2(1H)-one dissolved in a solvent selected from the group consisting of ethanol, isopropanol, ethanol and water, and isopropanol and water.

4. A palatable and stable suspension comprising a medicinally acceptable liquid vehicle and a product produced by the steps of (a) mixing (1) a complex magnesium aluminum silicate with (2) a solution of 7-chloro-1 - methyl - 5-phenyl-3H-1,4-benzodiazepin-2(1H)-one in ethanol and (b) removing said solvent.

5. A palatable and stable suspension comprising a medicinally acceptable liquid vehicle and a product produced by the steps of (a) mixing a complex magnesium aluminum silicate with a solution of 7-chloro-1-methyl-5-phenyl-3H-1,4-benzodiazepin-2(1H)-one in a mixture of isopropanol and water and (b) removing said solvent.

6. A palatable and stable suspension comprising a medicinally acceptable liquid vehicle and a product produced by the steps of (a) mixing a complex magnesium aluminum silicate with a solution of 7-chloro-1-methyl-5-phenyl-3H-1,4-benzodiazepin-2(1H)-one in a mixture of ethanol and water and (b) removing said solvent.

References Cited

UNITED STATES PATENTS

| | | | |
|---|---|---|---|
| 3,140,978 | 7/1964 | Zentner | 167—55 |
| 3,248,290 | 4/1966 | Zentner | 167—55 |

OTHER REFERENCES

Taccardi: Chem. Abst., vol. 59, 1963, p. 566 of abstract of a 1962 article.

SAM ROSEN, *Primary Examiner.*